US012633294B2

(12) United States Patent
McGrath et al.

(10) Patent No.: US 12,633,294 B2
(45) Date of Patent: May 19, 2026

(54) MATRIX CODED STEREO SIGNAL WITH PERIPHONIC ELEMENTS

(71) Applicant: Dolby Laboratories Licensing Corporation, San Francisco, CA (US)

(72) Inventors: David S. McGrath, Rose Bay (AU); Hao Luo, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 535 days.

(21) Appl. No.: 18/042,518

(22) PCT Filed: Aug. 26, 2021

(86) PCT No.: PCT/US2021/047817
§ 371 (c)(1),
(2) Date: Feb. 22, 2023

(87) PCT Pub. No.: WO2022/047078
PCT Pub. Date: Mar. 3, 2022

(65) Prior Publication Data

US 2023/0326469 A1 Oct. 12, 2023

Related U.S. Application Data

(60) Provisional application No. 63/127,919, filed on Dec. 18, 2020, provisional application No. 63/081,937, filed on Sep. 23, 2020.

(30) Foreign Application Priority Data

Aug. 27, 2020 (WO) ................ PCT/CN2020/111808
Jan. 8, 2021 (EP) .................................... 21150688

(51) Int. Cl.
*G10L 19/008* (2013.01)

(52) U.S. Cl.
CPC .................................. *G10L 19/008* (2013.01)

(58) Field of Classification Search
CPC .... G10L 19/008; G10L 9/167; H04S 2400/11; H04S 3/008; H04S 3/02; H04S 2420/03;
(Continued)

(56) References Cited

U.S. PATENT DOCUMENTS 5,757,927 A 5/1998 Gerzon et al.
5,858,026 A * 1/1999 Kim ........................ C09B 50/00 534/618

(Continued)

FOREIGN PATENT DOCUMENTS

DE 102017121876 A1 3/2019
WO 2018162803 A1 9/2018
WO 2019185988 A1 10/2019

OTHER PUBLICATIONS

Trevino et al, "A Spatial Extrapolation Method to Derive High-Order Ambisonics Data from Stereo Sources", 2015, J. Inf. Hiding Multim. Signal Process . . . Nov. 2015;6(6):1100-16. (Year: 2015).*

(Continued)

*Primary Examiner* — Olujimi A Adesanya

(57) ABSTRACT

Embodiments are disclosed for a matrix coded stereo signal with periphonic elements. A mixing matrix, suitable for processing a multi-channel audio input signal, is constructed so that the resulting multi-channel output signal contains the same audio elements from the input signal, wherein the spatial relationships between audio elements, as defined by panning rules associated with the input signal format, are preserved in the output signal, as defined by matrix encoding rules associated with the output signal format. The choice of the coefficients of the mixing matrix is governed by a phase-preference rule that is used to determine the appropriate phase to apply to each input signal channel.

15 Claims, 6 Drawing Sheets

(58) Field of Classification Search
CPC .. H04S 2420/11; H04S 2400/01; H04S 7/303; H04S 5/005
See application file for complete search history.

(56) References Cited

U.S. PATENT DOCUMENTS

| | | | | |
|---|---|---|---|---|
| 8,160,888 | B2 | 4/2012 | Breebaart | |
| 8,705,749 | B2 * | 4/2014 | McGrath | G10L 19/173 381/20 |
| 8,712,061 | B2 * | 4/2014 | Jot | G10L 19/008 381/23 |
| 9,173,048 | B2 | 10/2015 | McGrath | |
| 9,495,970 | B2 | 11/2016 | Dickins | |
| 9,980,071 | B2 | 5/2018 | Leschka | |
| 10,021,501 | B2 | 7/2018 | Adami | |
| 10,075,789 | B2 | 9/2018 | Stein | |
| 10,091,601 | B2 | 10/2018 | Boehm | |
| 10,410,641 | B2 | 9/2019 | Wang | |
| 10,490,200 | B2 | 11/2019 | Furse | |
| 10,748,516 | B2 | 8/2020 | Juha | |
| 2002/0063709 | A1 * | 5/2002 | Gilbert | H04N 23/698 345/427 |
| 2004/0062401 | A1 * | 4/2004 | Davis | H04S 3/02 381/1 |
| 2009/0092259 | A1 | 4/2009 | Jot | |
| 2012/0014527 | A1 * | 1/2012 | Furse | H04S 7/00 381/17 |
| 2014/0219460 | A1 * | 8/2014 | McGrath | H04S 3/02 381/23 |
| 2016/0044433 | A1 * | 2/2016 | Tsingos | H04S 3/002 381/307 |
| 2020/0168235 | A1 * | 5/2020 | Bernard | H04R 5/033 |
| 2021/0168548 | A1 * | 6/2021 | Honma | H04S 7/30 |

OTHER PUBLICATIONS

Batke et al, “Using VBAP-derived panning functions for 3D ambisonics decoding”, 2010, In2nd Ambisonics Symposium, Paris May 6, 2010. (Year: 2010).*

Jorge Trevino et al: “Enhancing Stereo Signals with High-Order Ambisonics Spatial Information” IEICE Transactions on Information and Systems, vol. E99.D, No. 1, Jan. 2016 (Jan. 2016), pp. 41-49, XP055430511, JP, ISSN: 0916-8532, DOI: 10.1587/transinf.2015MUI0001 the whole document.

* cited by examiner

FIG. 4
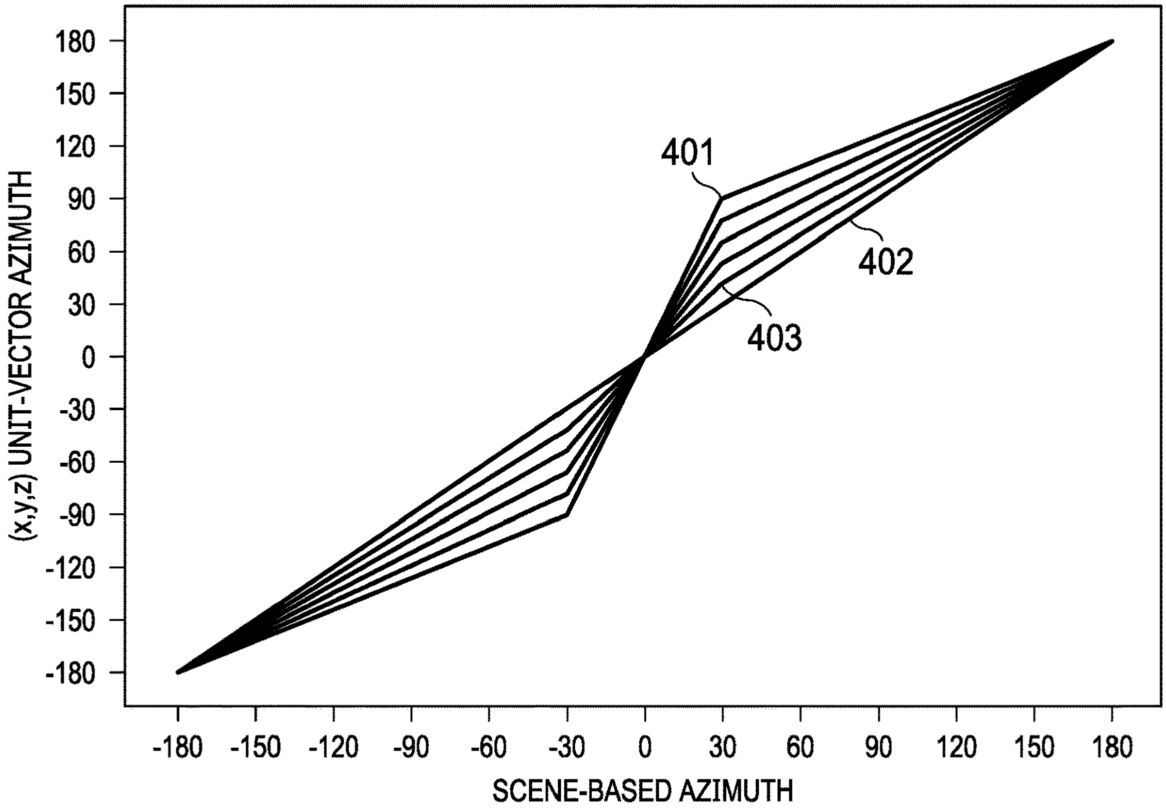
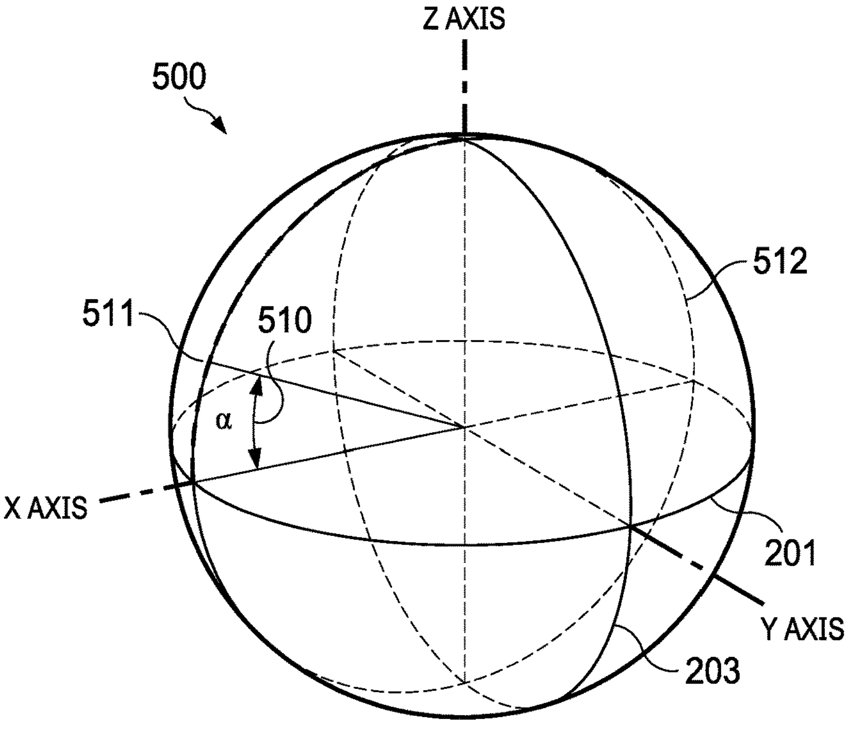
FIG. 5

MATRIX CODED STEREO SIGNAL WITH PERIPHONIC ELEMENTS

CROSS-REFERENCE TO RELATED APPLICATIONS

This application is a U.S. National Stage of International Application No. PCT/US2021/047817, filed Aug. 26, 2021, which claims priority to International Patent Application No. PCT/CN/2020/111808, filed 27 Aug. 2020; U.S. Provisional Patent Application No. 63/081,937, filed 23 Sep. 2020; U.S. Provisional Patent Application No. 63/127,919, filed 18 Dec. 2020; and European Patent Application No. 21150688.6, filed 8 Jan. 2021, all of which are incorporated herein by reference in their entirety.

TECHNICAL FIELD

This disclosure relates generally to audio signal processing.

BACKGROUND

In some audio processing applications, multiple audio channels are transported over a two-channel audio connection for the purpose of representing a spatial audio scene at a client audio device (e.g., a surround sound system) with, for example, height elements. This is achieved by downmixing an M-channel audio signal into a two-channel stereo signal, and sending the two-channel downmix signal and (optional) spatial parameters to a decoder, where the spatial audio scene is reconstructed using the downmix signal and the spatial parameters.

SUMMARY

Implementations are disclosed for a matrix coded stereo signal with periphonic elements. A mixing matrix, suitable for processing a multi-channel audio input signal, is constructed so that the resulting multi-channel output signal contains the same audio elements from the input signal, wherein the spatial relationships between audio elements, as defined by panning rules associated with the input signal format, are preserved in the output signal, as defined by matrix encoding rules associated with the output signal format. The choice of the coefficients of the mixing matrix is governed by a phase-preference rule that is used to determine the appropriate phase to apply to each input signal channel.

In an embodiment, a method of transforming a number of input audio channels to a number of output audio channels comprises: receiving an input audio signal comprising a number of input audio channels; generating a number of output audio channels by: associating each input audio channel with complex gain elements that are defined by a panning function, the panning function configured to adjust a panning behavior in a region around a first location on a unit sphere at an elevation angle and to shift a discontinuity in the region to a second location on the unit sphere at the elevation angle and opposite the first location on the unit sphere.

In an embodiment, the number of output channels is two.

In an embodiment, the elevation angle is 90 degrees.

In an embodiment, the elevation angle is a function of the unit vector.

In an embodiment, the panning function is computed as a product of a complex phase correction coefficient and the complex mixing gains.

In an embodiment, the encoding rules define a magnitude of two gain elements and a relative phase between the two gain elements.

In an embodiment, the encoding rules are defined to include a constraint on the panning function given by product of three-dimensional (3D) panning function and a Hermitian transpose of the 3D panning function.

In an embodiment, the panning function has a dominant direction at a first panning position and a discontinuity at a second panning position.

In an embodiment, a method of transforming a number of input audio channels to a number of output audio channels comprises: receiving an input audio signal comprising a number of input audio channels; generating a number of output audio channels by: associating each input audio channel with a set of mixing gains, where each set of mixing gains contains a number of complex gain elements; associating each of the complex gain elements with a respective one of the output audio channels; associating each of the input channels with a respective unit vector; defining an amplitude and relative phase between the complex gain elements in each of the sets of mixing gains as a function of the respective unit vector for the respective input audio channel according to encoding rules; and determining an absolute phase of the complex gain elements in each of the sets of mixing gains according to a phase-preference rule, wherein the phase-preference rule is chosen to provide a degree of phase compatibility between different sets of mixing gains.

In an embodiment, a method of transforming a number of input audio channels to a number of output audio channels, the method comprising: for each input channel: determining a unit vector associated with the input channel; determining a prototype gain vector for input channel based on the unit vector; determining a dominant elevation angle for the input channel based on function of the unit vector; determining a phase correction for the input channel based on the prototype gain vector and the dominant elevation angle; determining mixing gains for the input channel by applying the phase correction to the prototype gain vector; and generating an output audio channel by applying the mixing gains to the input channel.

Other implementations disclosed herein are directed to a system, apparatus and computer-readable medium. The details of the disclosed implementations are set forth in the accompanying drawings and the description below. Other features, objects and advantages are apparent from the description, drawings and claims.

Particular implementations disclosed herein provide one or more of the following advantages. An N-channel audio input signal representing a spatial audio scene is downmixed to a two-channel downmix signal suitable for transporting the spatial audio scene, according to a continuous panning function that adheres to certain matrix-encoding rules, wherein the effect of a discontinuity in the panning function is minimized based on assumptions regarding the assumed typical distribution of object locations.

DESCRIPTION OF DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

FIG. 4 is a diagram illustrating the modification of azimuth angles, according to some embodiments.

FIG. 5 illustrates the unit-sphere including a dominant angle, according to some embodiments.

The same reference symbol used in various drawings indicates like elements.

DETAILED DESCRIPTION

Figure 1:
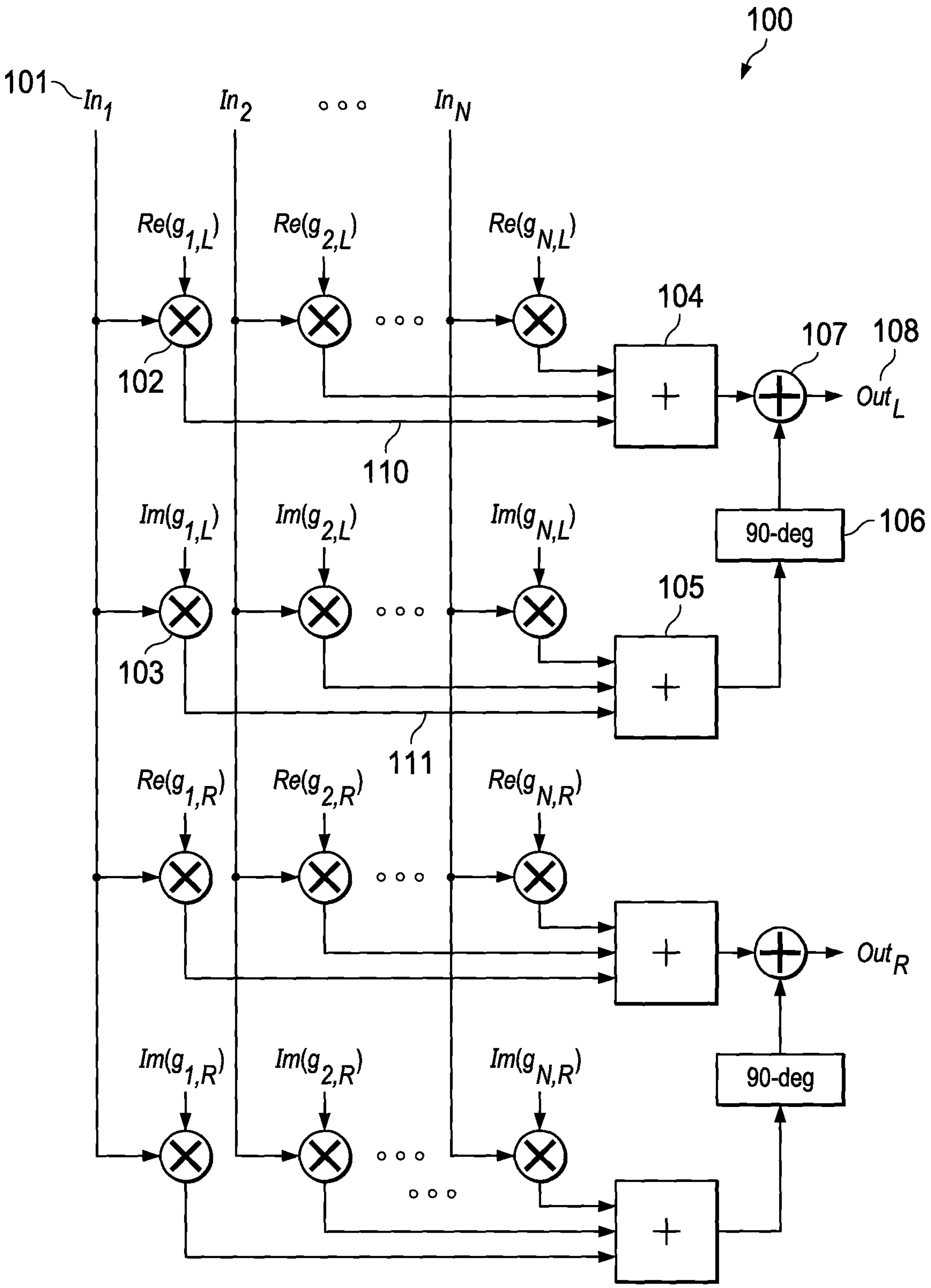
FIG. 1 is a block diagram of a mixer, according to some embodiments.

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

Overview

A spatial audio scene may be represented in the form of N audio objects, where each audio object consists of an audio signal and location information that indicates the position of the audio object within the scene. It is common to simplify a complex audio scene by mixing the audio signals for each respective object into a smaller set of M audio signals (a multi-channel audio scene representation), where commonly M<N. This mixing may be adapted, for each audio object, based on the location information for the audio object. The location information may be fixed or dynamic. The M-channel audio signal is commonly referred to as a downmix signal.

The location of each object may be associated with an (x,y,z) unit vector, indicative of a direction in a three-dimensional (3D) vector space. It is therefore desirable to be able to define the M mixing gains that are used to mix the audio object's audio signal to the M-channel output signal according to the object location, which can be expressed in the form of a panning function p: $\mathbb{R}^3 \to \mathbb{C}^M$:

$$p(x, y, z) = \begin{pmatrix} g_1 \\ g_2 \\ \vdots \\ g_M \end{pmatrix}. \quad [1]$$

The use of complex mixing gains allows the mixing process to include both magnitude and phase modifications of the input audio signals. Mixing of N input signals ($In_1$, $In_2$, . . . , $In_N$) to form the M channel output ($Out_1$, $Out_2$, . . . , $Out_M$) may be written as:

$$\begin{pmatrix} Out_1 \\ Out_2 \\ \vdots \\ Out_M \end{pmatrix} = \sum_{n=1}^{N} p(x_n, y_n, z_n) \times In_n, \quad [2]$$

where $x_n$, $y_n$ and $z_n$ represent the (x,y,z) location associated with object n. In the description that follows, the x-axis points in the forward direction, the y-axis points to the left, and the z-axis points directly upwards, following a right-hand rule.

Equation [2] may also be written in matrix form as:

$$Out = M \times In, \quad [3]$$

where:

$$M = \begin{pmatrix} g_{1,1} & g_{2,1} & \cdots & g_{N,1} \\ g_{1,2} & g_{2,2} & \cdots & g_{N,2} \\ \vdots & \vdots & \ddots & \vdots \\ g_{1,M} & g_{2,M} & \cdots & g_{N,M} \end{pmatrix}, \quad [4]$$

and wherein column n of the matrix M in Equation [4] is formed according to:

$$\begin{pmatrix} g_{n,1} \\ g_{n,2} \\ \vdots \\ g_{n,M} \end{pmatrix} = p(x_n, y_n, z_n) \text{ for } 1 \le n \le N. \quad [5]$$

The M-channel downmix signal may be optionally remixed by a subsequent upmixing process, to enable reconstruction of the original spatial audio scene. Upmixers may make use of data derived from the covariance of the M-channel downmix signal.

Example N-Channel to Stereo Mixer

FIG. 1 illustrates a mixer 100 that takes N input audio channels ($In_1$, $In_2$, . . . , $In_N$) and creates 2 output audio channels ($Out_L$ and $Out_R$). The function of this mixer is determined by the coefficients of the gain matrix:

$$M = \begin{pmatrix} g_{1,L} & g_{2,L} & \cdots & g_{N,L} \\ g_{1,R} & g_{2,R} & \cdots & g_{N,R} \end{pmatrix} \quad [6]$$

Mixer 100 implements the imaginary part of the complex mixing gains by applying 90-degree phase shifting operations using 90-degree phase-shifter 106. In the example shown, the input signal $In_1$ 101 is multiplied 102 by the real part of the gain $g_{1,L}$ to produce the real-scaled signal 110. The input signal $In_1$ 101 is multiplied 103 by the imaginary part of the gain $g_{1,L}$ to produce the imaginary-scaled signal 111. Summing node 104 combines the real-scaled signals, e.g., 110, and summing node 105 combines imaginary-scaled signals, e.g., 111. The combined imaginary-scaled signal is processed by 90-degree phase-shifter 106 and the phase-shifted signal is summed 107 with the combined real-scaled signal to produce the output the left channel output $Out_L$ 108. The right channel output $Out_L$ 108 is generated in a similar manner as the left channel output.

Column n of the matrix M contains the complex gains, $$\begin{pmatrix} g_{n,L} \\ g_{n,R} \end{pmatrix},$$

that specify how the input signal $In_n$ contributes to the output signals, $Out_L$ and $Out_R$. In some embodiments, the gain elements in column n are defined by a panning function:

$$p(x_n, y_n, z_n) = \begin{pmatrix} g_{n,L} \\ g_{n,R} \end{pmatrix} \quad [7]$$

wherein input channel n is associated with a unit-vector ($x_n$,$y_n$,$z_n$).

Figure 2:
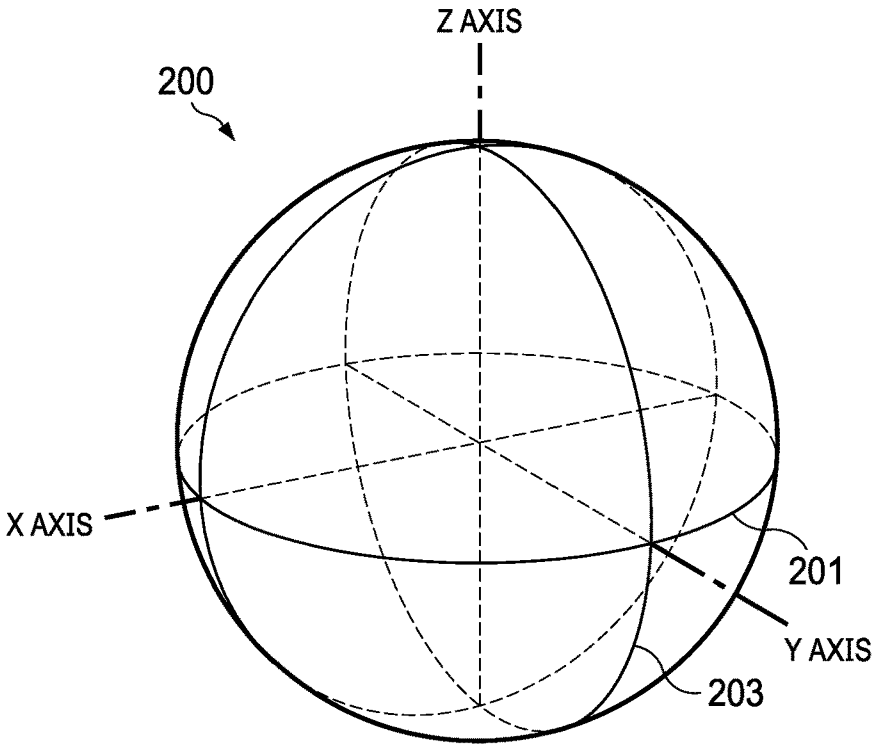
FIG. 2 is a diagram illustrating the coordinate axes and key components of a unit-sphere, according to some embodiments.

FIG. 2 illustrates unit sphere 200 having x, y, z axes. Horizontal ring 201 represents the two-dimensional (2D) set $\{(x,y) \in \mathbb{R}^2: x^2+y^2=1\}$. Each input channel to the mixer is associated with an (x,y,z) unit vector (which may also vary over time) that lies on the surface of the unit sphere 200. Commonly, a spatial audio scene may be represented by a set of audio channels that are intended for playback over an array of speakers with pre-defined spatial locations. One example is an 11-channel (N=11) format with speakers that are intended to be located according to Table I below.

TABLE I

Locations of Speakers in an Example 11-channel Speaker Layout

| Chan Name | Elevation | Azimuth | Warp Az | (x, y, z) |
|---|---|---|---|---|
| L | 0° | 30° | 90° | (0, 1, 0) |
| R | 0° | −30° | −90° | (0, −1, 0) |
| C | 0° | 0° | 0° | (1, 0, 0) |
| Ls | 0° | 90° | 126° | (−0.59, 0.81, 0) |
| Rs | 0° | −90° | −126° | (−0.59, −0.81, 0) |
| Lb | 0° | 135° | 162° | (−0.98, 0.19, 0) |
| Rb | 0° | −135° | −162° | (−0.98, −0.19, 0) |
| Lft | 45° | 45° | 72° | (0.22, 0.67, 0.71) |
| Rft | 45° | −45° | −72° | (0.22, −0.67, 0.71) |
| Lbt | 45° | 135° | 144° | (−0.57, 0.42, 0.71) |
| Rbt | 45° | −135° | −144° | (−0.57, −0.42, 0.71) |

Figure 3:
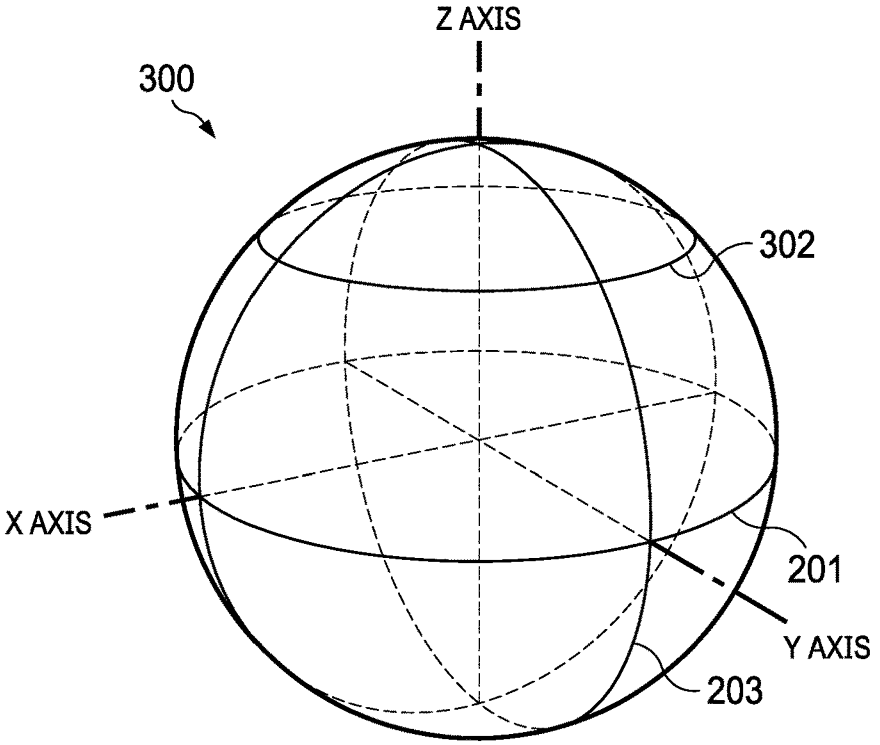
FIG. 3 is a diagram illustrating the unit-sphere including an upper-ring, according to some embodiments.

The example arrangement of speakers in Table I includes 7 speakers in the horizontal plane (z=0) and 4 speakers at an elevation of 45° (z=0.71). The azimuth angles shown in Table I correspond to the positions where these speakers may be intended for placement in a listening environment to re-create the spatial audio scene accurately. The column labeled "Warped Az" indicates a modified azimuth angle that is used to adjust the relative spacing of the (x,y,z) unit vectors associated with each channel. This warped spacing of the unit vectors associated with each channel may be applied so as to improve the ability of an upmixer to regenerate the spatial audio scene from the downmix signals. It will be appreciated that many variants of the above warping process may be applied, and in general, any warping process may be used FIG. 3 illustrates unit sphere 300 with elevated ring 302 indicating unit-vectors at +45° elevation. It is common for audio channels to be associated with unit vectors that lie on elevated ring 302 at other elevation angles above the xy plane. An audio channel may also be associated with unit vectors that lie below the xy plane (where z<0).

FIG. 4 shows an example of warping functions, where the horizontal axis shows the azimuth of the spatial location of an audio channel (the location where a speaker is intended to be placed in order to provide a faithful playback of the spatial audio scene). The vertical axis shows alternative warped azimuth angles that may be used to derive the (x,y,z) unit vectors for the respective channels. The mapping 401 will warp the azimuth angles of the channels so that, for example, a channel that is intended for spatial placement at 30° azimuth will be associated with an (x,y,z) unit vector at an azimuth of 90°. Different warping functions can be applied for different elevation angles, so that an object at 0° elevation can be warped with one function, and an object at 45° elevation can be warped by a second, different function. Optional interpolated warping functions 403 may be applied for some elevation angles, if needed.

When the number of downmix channels in this example is M=2, and the audio objects are associated with direction vectors that lie in the horizontal ring 201, so that the direction vectors are of the form (x,y,0), the panning function p(x,y,z) can be adapted to provide a downmix signal that adheres to the matrix encoding rules (hereinafter, also referred to as "encoding rules"), and the spatial audio scene can be reconstructed using an upmixer.

The 2D matrix encoding rules may be defined to include the following constraint on the panning function p(x,y,z) (for the special case where z=0):

$$p(x,y,0)\times p(x,y,0)^H=\begin{pmatrix}\frac{1+y}{2} & \frac{x}{2}\\ \frac{x}{2} & \frac{1-y}{2}\end{pmatrix} \quad [8]$$

where the $A^H$ operator indicates the Hermitian transpose of a matrix or vector.

The matrix-encoding rule of Equation [8] assumes that the unit vectors all lie in a 2D plane (the xy plane containing horizontal ring 201 shown in FIG. 2). When the unit vectors that are associated with a collection of objects span 3D space, it becomes necessary to define the matrix encoding rules for cases where z may be non-zero. The matrix encoding rules for cases where z may be non-zero are defined by Equation [9]:

$$p(x,y,z)\times p(x,y,z)^H=\begin{pmatrix}\frac{1+y}{2} & \frac{x+jz}{2}\\ \frac{x-jz}{2} & \frac{1-y}{2}\end{pmatrix} \quad [9]$$

Note that the matrix encoding rule in Equation [9] is an example of a 3D matrix-encoding rule. In alternative embodiments, the rule may be adapted to include the conjugate of the matrix on the right-hand-side of Equation [9] (a "conjugate matrix encoding rule"). The following discussion will be based on the rule shown in Equation [9], but it will be appreciated by those skilled in the art that the methods described herein may be adapted to also apply to the conjugated matrix encoding rule. Henceforth, a reference to "matrix-encoding rules," is a reference to the 3D matrix encoding rule of Equation [9]. Note that the matrix-encoding rules are formulated as mathematically matrices and vectors. In practice, however, matrix vector multiplications may be represented in any desired data structure, including as 1D and 2D arrays of values.

There are multiple functions that will satisfy the matrix-encoding rules. If the panning function p(x,y,z) satisfies the matrix encoding rules (i.e., satisfies Equation [9]), then the phase-shifted panning function p'(x,y,z)=λ(x,y,z)×p(x,y,z) (where the phase-shift function is defined as $\lambda(x,y,z)\in\mathbb{C}$ and $|\lambda(x,y,z)|=1$) will also satisfy Equation [9].

It will be appreciated by those skilled in the art that, for a given unit vector (x,y,z), the matrix encoding rules define the magnitude of the two gain elements, and the relative phase between the two gain elements. However, the matrix encoding rules do not constrain the absolute phase of the two gain elements. Hence, the phase-shift function, defined by λ(x,y,z), may be applied in the creation of a panning function to suit the characteristics of the soundfield being represented.

In one particular example, two input channels (without loss of generality, assume they are channels 1 and 2) are associated with unit-vectors $(x_1,y_1,z_1)$ and $(x_2,y_2,z_2)$. If these two unit vectors are close together, we may wish to ensure that the panning gains $$p(x_1,y_1,z_1)=\begin{pmatrix}g_{1,L}\\ g_{1,R}\end{pmatrix} \text{ and } p(x_2,y_2,z_2)=\begin{pmatrix}g_{2,L}\\ g_{2,R}\end{pmatrix}$$

are close together. This equates to a desire for the panning function to be a continuous function of the (x,y,z) unit vector. However, since no continuous panning function exists, it becomes necessary to make a choice regarding the location (in terms of the (x,y,z) unit vector) where a discontinuity is to exist in the panning function (hereinafter, a "phase-preference" rule). This discontinuity may be moved to an arbitrary location on the unit-circle by choosing the appropriate phase-shift function λ(x,y,z).

Based on the foregoing, in some embodiments a method of transforming an N-channel input audio signal to an M-channel output audio signal comprises: receiving N input audio channels; and generating M output audio channels by: associating each input audio channel with a respective column of a matrix of mixing gains, where each column of the matrix of mixing gains contains a number of complex gain elements; associating each of the complex gain elements with a respective one of the output audio channels; associating each of the input channels with a respective unit vector; defining an amplitude and relative phase between the complex gain elements in each of the columns as a function of the respective unit vector for the respective input audio channel according to matrix encoding rules; and determining an absolute phase of the complex gain elements in each of the columns according to a phase-preference rule, wherein the phase-preference rule is chosen to provide a degree of phase compatibility between different columns of the matrix of mixing gains.

In some embodiments, the following terminology is defined for panning functions:

- p(x,y,z) is the name given to a generic panning function (any function that satisfies the matrix encoding rules)
- $p_{up}(x,y,z)$ is the name given to a particular panning function that has a dominant direction at (x,y,z)=(0,0,1) (facing upwards), and consequently has a discontinuity at (x,y,z)=(0,0,−1):

$$p_{up}(x,y,z)=\frac{1}{\sqrt{8(1+z)}}\begin{pmatrix}(1+j)(1+z)+(1-j)(x+jy)\\ (1-j)(1+z)+(1+j)(x+jy)\end{pmatrix} \quad [10]$$

- $p_\alpha(x,y,z)$ is the name given to the panning function that has its dominant direction at (x,y,z)=(cos α,0,sin α) (in the forward direction, at an elevation of α), and consequently has a discontinuity at (x,y,z)=(−cos α,0,−sin α). Note that when α=90°, $p_\alpha(x,y,z)=p_{90°}(x,y,z)=p_{up}(x,y,z)$.

The $p_{up}(x,y,z)$ function of Equation [10] is defined for all real x, y, z, where $x^2+y^2+z^2=1$, except for z=−1. To ensure that the function is defined over all unit vectors, (x,y,z), a value of the function is chosen at (x,y,z)=(0,0,−1). In some embodiments, the value chosen is:

$$p_{up}(0,0,-1)=\frac{1}{2}\begin{pmatrix}1-j\\ 1+j\end{pmatrix}. \quad [11]$$

The $p_{up}(x,y,z)$ function of Equation [11] satisfies the matrix encoding rules, and hence it would be acceptable to use this function to define the mixing matrix $M_{up}$ by setting $p(x,y,z)=p_{up}(x,y,z)$. Equation [12] shows the resulting mixing coefficients (note that this equation shows the matrix in transposed form):

$$M_{up}^T = \begin{pmatrix} 0.71+0.71j & 0.00+0.00j \\ 0.00-0.00j & 0.71-0.71j \\ 0.71+0.00j & 0.71+0.00j \\ 0.43+0.85j & -0.14-0.28j \\ -0.14+0.28j & 0.43-0.85j \\ 0.13+0.80j & -0.09-0.58j \\ -0.09+0.58j & 0.13-0.80j \\ 0.70+0.58j & 0.34-0.22j \\ 0.34+0.22j & 0.70-0.58j \\ 0.42+0.73j & 0.19-0.50j \\ 0.19+0.50j & 0.42-0.73j \end{pmatrix} \quad [12]$$

FIG. 5 illustrates the unit sphere with a point 511 defined by an elevation angle α 510 (with the azimuth angle being 0°). The point 512 is opposite to the point 511. In some embodiments, the panning function $p_\alpha(x,y,z)$ is computed to provide an improved panning behavior in the region around the point 511 at elevation angle α, and to shift the discontinuity to the point 512, according to the elevation angle α.

In some embodiments, the choice of the elevation angle α may vary as a function $\alpha=f_\alpha(x,y,z)$, and the resulting panning function is referred to as $p_{f_\alpha}(x,y,z)$ to indicate that α is a function, rather than being a fixed quantity. In some embodiments, the $p_{f_\alpha}(x,y,z)$ function is defined according to the following procedure:

Procedure A:

Step 1:

Given a unit vector (x,y,z), compute the [2×1] column vector of gains:

$$G' = p_{up}(x, y, z) = \begin{pmatrix} g_1' \\ g_2' \end{pmatrix}, \quad [13]$$

where G' is also referred to herein as a "prototype" gain vector.

Step 2:

Choose a value for dominant elevation angle α that is typically in the range of 0≤α≤90°, according to:

$$\alpha=f_\alpha(x,y,z) \quad [14]$$

Step 3:

Compute a complex phase-correction coefficient, λ:

$$\lambda = \text{sign}\left(\overline{g_1'}e^{\frac{1}{2}j\alpha} + \overline{g_2'}e^{-\frac{1}{2}j\alpha}\right) \quad [15]$$

where sign( ) is the signum function:

$$\text{sign}(a) = \begin{cases} 1 & \text{when } a = 0 \\ \frac{a}{|a|} & \text{otherwise} \end{cases}$$

Step 4:

The value of $p_{f_\alpha}(x,y,z)$ is then defined to be:

$$p_{f_\alpha}(x, y, z) = \lambda \times G' = \begin{pmatrix} \lambda g_1' \\ \lambda g_2' \end{pmatrix} \quad [16]$$

In some embodiments, the dominant elevation angle, α is determined, as a function of the unit-vector (x,y,z) so that unit vectors for the upper forward quarter of the sphere (where x>0 and z>0), $f_\alpha(x,y,z)=0$, and for unit-vectors in the horizontal plane at the back (where x<−0.7 and z=0), $f_\alpha(x,y,z)=90°$.

In some embodiments, the dominant elevation angle, α, is determined as a function of the unit vector (x,y,z) as follows:

$$\alpha=f_\alpha(x,y,z)=270t(x,y,z)^2-180t(x,y,z)^3$$

$$\text{where: } t(x,y,z)=\max(0,\min(1,-\sqrt{2}x-1/2z)) \quad [17 \text{ and } 18]$$

In some embodiments, the $p_{f_\alpha}(x,y,z)$ function is implemented according to Procedure A and Equations [17] and [18], and used to build the mix matrix shown in Equation [19]:

$$M^T = \begin{pmatrix} 1.00+0.00j & 0.00+0.00j \\ 0.00+0.00j & 1.00+0.00j \\ 0.71+0.00j & 0.71+0.00j \\ 0.06+0.95j & -0.02-0.31j \\ -0.02+0.31j & 0.06-0.95j \\ 0.00+0.81j & -0.00-0.59j \\ -0.00+0.59j & 0.00-0.81j \\ 0.86+0.32j & 0.25-0.32j \\ 0.25+0.32j & 0.86-0.32j \\ 0.44+0.72j & 0.18-0.51j \\ 0.18+0.51j & 0.44-0.72j \end{pmatrix} \quad [19]$$

Example Process

Figure 6A:
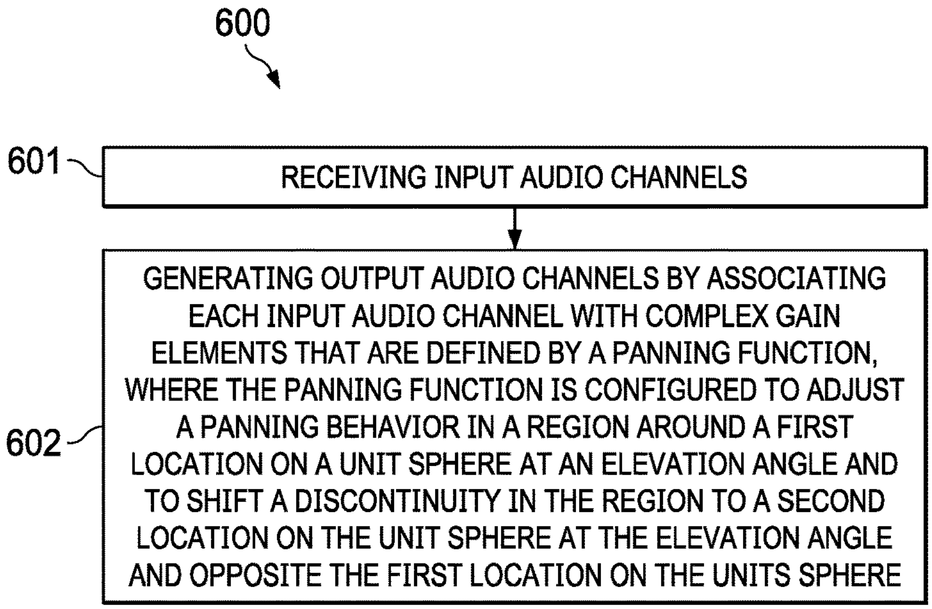
FIG. 6A is a flow diagram of process of transforming a number of channels of an input audio signal to a number of output channels of an output audio signal, according to some embodiments.

FIG. 6A is a flow diagram of process 600 of transforming a number of channels of an input audio signal to a number of output channels of an output audio signal, according to some embodiments. Process 600 can be implemented using the device architecture shown in FIG. 7.

Process 600 receives an input audio signal comprising a number of input audio channels (601) and generates a number of output audio channels by associating each input audio channel with complex gain elements that are defined by a panning function, where the panning function is configured to adjust a panning behavior in a region around a first location on a unit sphere at an elevation angle and to shift a discontinuity in the region to a second location on the unit sphere at the elevation angle and opposite the first location on the unit sphere (602).

Figure 6B:
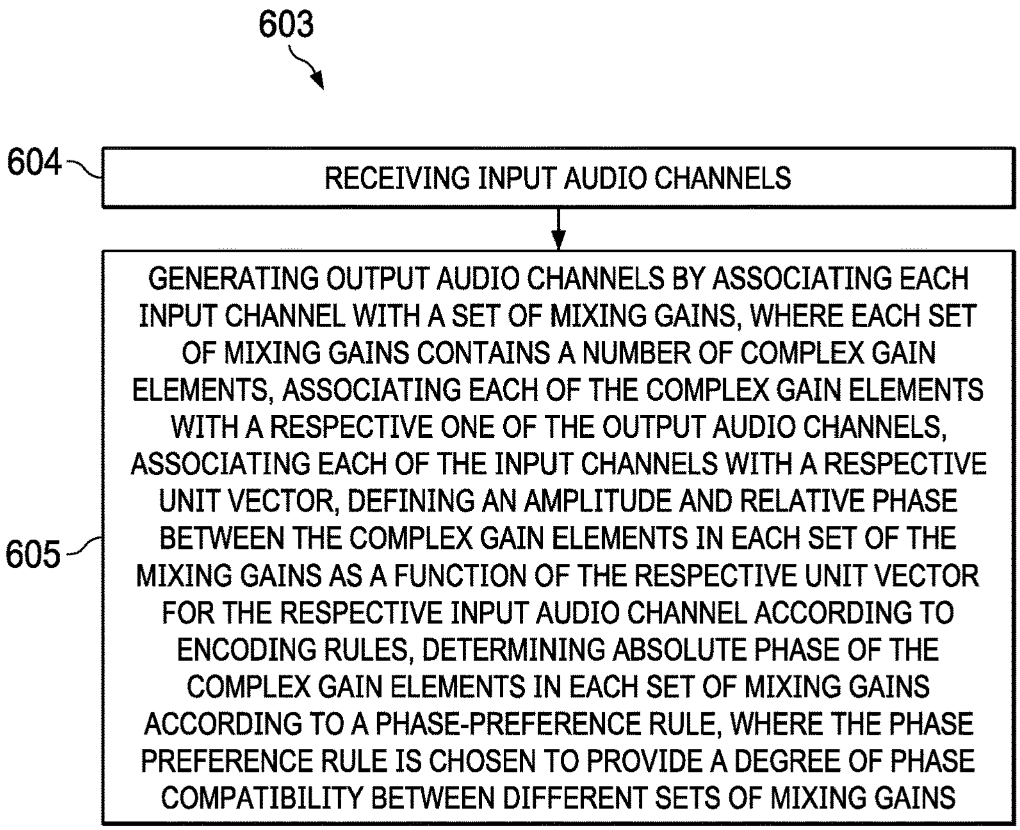
FIG. 6B is a flow diagram of an alternative process of transforming a number of channels of an input audio signal to a number of output channels of an output audio signal, according to some embodiments.

FIG. 6B is a flow diagram of process 603 of transforming a number of channels of an input audio signal to a number of output channels of an output audio signal, according to some embodiments. Process 603 can be implemented using the device architecture shown in FIG. 7.

Process 603 receives an input audio signal comprising a number of input audio channels and generates a number of output audio channels by associating each input audio channel with a set of mixing gains, where each set of mixing gains contains a number of complex gain elements, associating each of the complex gain elements with a respective one of the output audio channels, associating each of the input audio channels with a respective unit vector, defining an amplitude and relative phase between the complex gain elements in each set of mixing gains as a function of the respective unit vector for the respective input audio channel according to encoding rules, and determining an absolute phase of the complex gain elements in each set of mixing gains according to a phase-preference rule, where the phase-preference rule is chosen to provide a degree of phase compatibility between different sets of mixing gains (604).

Figure 6C:
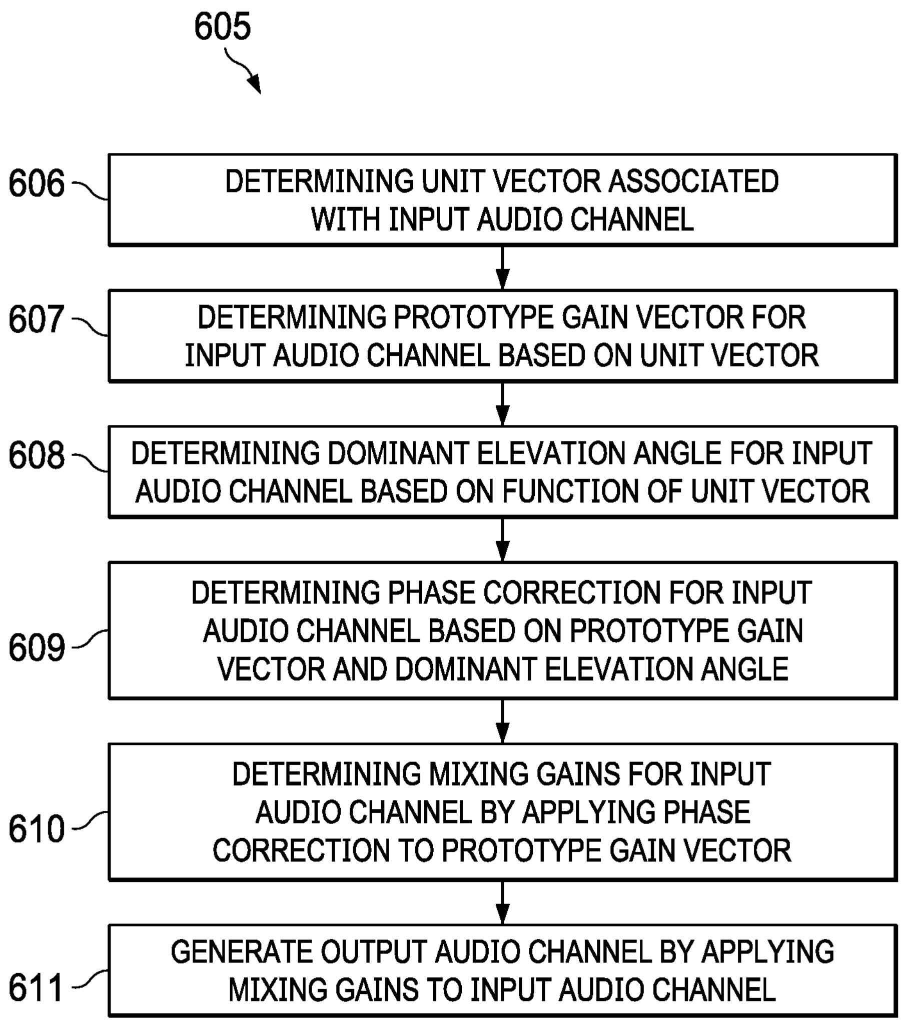
FIG. 6C is a flow diagram of alternative process of transforming a number of channels of an input audio signal to a number of output channels of an output audio signal, according to some embodiments.

FIG. 6C is a flow diagram of process 605 of transforming a number of channels of an input audio signal to a number of output channels of an output audio signal, according to some embodiments. Process 605 can be implemented using the device architecture shown in FIG. 7.

Process 605 determines a unit vector associated with an input audio channel (606), determines a prototype gain vector for the input audio channel based on the unit vector (607), determines a dominant elevation angle for the input audio channel based on function of the unit vector (608), determines a phase correction for the input audio channel based on the prototype gain vector and the dominant elevation angle (609), determines mixing gains for the input audio channel by applying the phase correction to the prototype gain vector (610), and generates an output audio channel by applying the mixing gains to the input audio channel (611).

Each of the steps recited in processes 600, 603 and 605 are described in further detail in reference to FIGS. 1-5.

Example System Architecture

Figure 7:
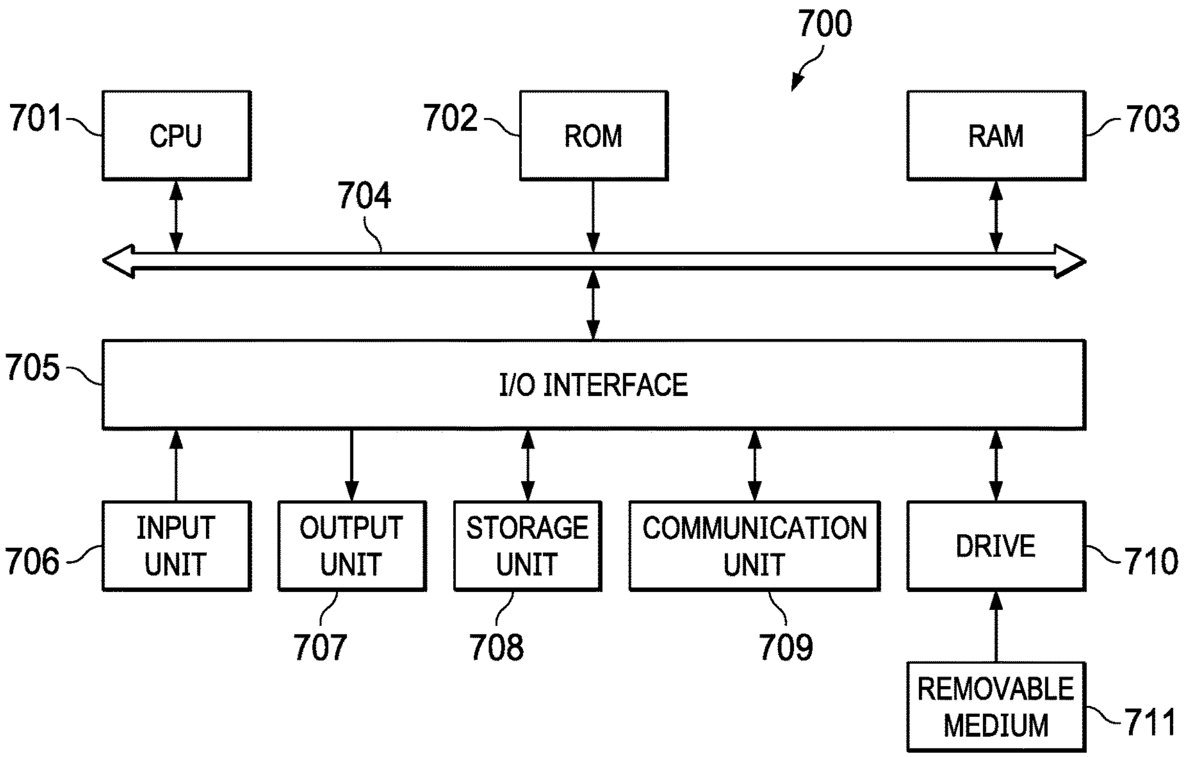
FIG. 7 shows a block diagram of an example system suitable for implementing example embodiments of the present disclosure.

FIG. 7 shows a block diagram of an example system 700 suitable for implementing example embodiments of the present disclosure. System 700 includes any devices that are capable of playing audio, including but not limited to: smart phones, tablet computers, wearable computers, vehicle computers, game consoles, surround systems, kiosks.

As shown, the system 700 includes a central processing unit (CPU) 701 which is capable of performing various processes in accordance with a program stored in, for example, a read only memory (ROM) 702 or a program loaded from, for example, a storage unit 708 to a random access memory (RAM) 703. In the RAM 703, the data required when the CPU 701 performs the various processes is also stored, as required. The CPU 701, the ROM 702 and the RAM 703 are connected to one another via a bus 704. An input/output (I/O) interface 705 is also connected to the bus 704.

The following components are connected to the I/O interface 705: an input unit 706, that may include a keyboard, a mouse, or the like; an output unit 707 that may include a display such as a liquid crystal display (LCD) and one or more speakers; the storage unit 708 including a hard disk, or another suitable storage device; and a communication unit 709 including a network interface card such as a network card (e.g., wired or wireless).

In some implementations, the input unit 706 includes one or more microphones in different positions (depending on the host device) enabling capture of audio signals in various formats (e.g., mono, stereo, spatial, immersive, and other suitable formats).

In some implementations, the output unit 707 include systems with various number of speakers. As illustrated in FIG. 7, the output unit 707 (depending on the capabilities of the host device) can render audio signals in various formats (e.g., mono, stereo, immersive, binaural, and other suitable formats).

The communication unit 709 is configured to communicate with other devices (e.g., via a network). A drive 710 is also connected to the I/O interface 705, as required. A removable medium 711, such as a magnetic disk, an optical disk, a magneto-optical disk, a flash drive or another suitable removable medium is mounted on the drive 710, so that a computer program read therefrom is installed into the storage unit 708, as required. A person skilled in the art would understand that although the system 700 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 809, and/or installed from the removable medium 711, as shown in FIG. 7.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components of FIG. 7), thus, the control circuitry may be performing the actions described in this disclosure. Some aspects may be implemented in hardware, while other aspects may be implemented in firmware or software which may be executed by a controller, microprocessor or other computing device (e.g., control circuitry).

While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Various aspects of the present invention may be appreciated from the following enumerated example embodiments (EEEs):

EEE1. A method of transforming a number of input audio channels to a number of output audio channels, the method comprising:
- receiving, using at least one processor, an input audio signal comprising a number of input audio channels;
- generating, using the at least one processor, a number of output audio channels by:
  - associating each input audio channel with complex gain elements that are defined by a panning function, the panning function configured to adjust a panning behavior in a region around a first location on a unit sphere at an elevation angle and to shift a discontinuity in the region to a second location on the unit sphere at the elevation angle and opposite the first location on the unit sphere.

EEE2. The method of EEE 1, wherein the number of output channels is two.

EEE3. The method of EEE 1 or EEE 2, wherein the elevation angle is 90 degrees.

EEE4. The method of EEE 1 or EEE 2, wherein the elevation angle is a function of the unit vector.

EEE5. The method of any of EEEs 1-4, wherein the panning function $p_{f_\alpha}(x,y,z)$ is given by:

$$p_{f_\alpha}(x, y, z) = \lambda \times G' = \begin{pmatrix} \lambda g_1' \\ \lambda g_2' \end{pmatrix},$$

where $\lambda$ is a complex phase correction coefficient and G' is a two by one column vector of complex gains.

EEE6. The method of any of the preceding EEEs, wherein the encoding rules define a magnitude of two gain elements and a relative phase between the two gain elements.

EEE7. The method of any of the preceding EEEs, wherein the encoding rules are defined to include a constraint on the panning function given by:

$$p_{f_\alpha}(x, y, z) = p_{f_\alpha}(x, y, z)^H = \begin{pmatrix} \frac{1+y}{2} & \frac{x+jz}{2} \\ \frac{x-jz}{2} & \frac{1-y}{2} \end{pmatrix},$$

where x, y, z are components of a unit vector in a Cartesian coordinate frame, z is non-zero and $p_{f_\alpha}(x,y,z)^H$ is a Hermitian transpose of the panning $p_{f_\alpha}(x,y,z)$.

EEE8. The method of any of EEEs 1-4, wherein the panning function $p_{up}(x,y,z)$ has a dominant direction at a first panning position $p_{up}(0,0,1)$ and a discontinuity at a second panning position $p_{up}(0,0,-1)$.

EEE9. The method of EEE 8, wherein the panning function $p_{up}(x,y,z)$ is given by:

$$p_{up}(x, y, z) = \frac{1}{\sqrt{8(1+z)}} \begin{pmatrix} (1+j)(1+z) + (1-j)(x+jy) \\ (1-j)(1+z) + (1+j)(x+jy) \end{pmatrix}$$

EEE10. A method of transforming a number of input audio channels to a number of output audio channels, the method comprising:
- receiving, using at least one processor, an input audio signal comprising a number of input audio channels;
- generating, using the at least one processor, a number of output audio channels by:
  - associating each input audio channel with a set of mixing gains, where each set of mixing gains contains a number of complex gain elements;
  - associating, using the at least one processor, each of the complex gain elements with a respective one of the output audio channels;
  - associating each of the input channels with a respective unit vector;
  - defining an amplitude and relative phase between the complex gain elements in each of the sets of mixing gains as a function of the respective unit vector for the respective input audio channel according to encoding rules; and
  - determining an absolute phase of the complex gain elements in each of the sets of mixing gains according to a phase-preference rule, wherein the phase-preference rule is chosen to provide a degree of phase compatibility between different sets of mixing gains.

EEE11. The method of EEE 10, wherein the number of output channels is two.

EEE12. The method of EEE 10 or EEE 11, wherein the elevation angle is 90 degrees.

EEE13. The method of EEE 10 or EEE 11, wherein the elevation angle is a function of the unit vector.

EEE14. The method of any of EEEs 10-13, wherein the panning function $p_{f_\alpha}(x,y,z)$ is given by:

$$p_{f_\alpha}(x, y, z) = \lambda \times G' = \begin{pmatrix} \lambda g_1' \\ \lambda g_2' \end{pmatrix},$$

where λ is a complex phase correction coefficient and G' is a two by one column vector of complex gains.

EEE15. The method of any of the EEEs 10-14, wherein the encoding rules are defined to include a constraint on the panning function given by:

$$p_{f_\alpha}(x, y, z) = p_{f_\alpha}(x, y, z)^H = \begin{pmatrix} \frac{1+y}{2} & \frac{x+jz}{2} \\ \frac{x-jz}{2} & \frac{1-y}{2} \end{pmatrix},$$

where x, y, z are components of a unit vector in a Cartesian coordinate frame, z is non-zero and $p_{f_\alpha}(x,y,z)^H$ is a Hermitian transpose of the panning $p_{f_\alpha}(x,y,z)$.

EEE16. The method of any of the EEEs 10-14, wherein the panning function $p_{up}(x,y,z)$ has a dominant direction at a first panning position $p_{up}(0,0,1)$ and a discontinuity at a second panning position $p_{up}(0,0,-1)$.

EEE17. The method of EEE 16, wherein the panning function $p_{up}(x,y,z)$ is given by:

$$p_{up}(x, y, z) = \frac{1}{\sqrt{8(1+z)}} \begin{pmatrix} (1+j)(1+z) + (1-j)(x+jy) \\ (1-j)(1+z) + (1+j)(x+jy) \end{pmatrix}$$

EEE18. A method of transforming a number of input audio channels to a number of output audio channels, the method comprising:

for each input channel:

determining, using at least one processor, a unit vector associated with the input channel;

determining, using the at least one processor, a prototype gain vector for input channel based on the unit vector;

determining, using the at least one processor, a dominant elevation angle for the input channel based on function of the unit vector;

determining, using the at least one processor, a phase correction for the input channel based on the prototype gain vector and the dominant elevation angle;

determining, using the at least one processor, mixing gains for the input channel by applying the phase correction to the prototype gain vector; and generating, using the at least one processor, an output audio channel by applying the mixing gains to the input channel.

EEE19. A system comprising:

one or more processors; and a non-transitory computer-readable medium storing instructions that, upon execution by the one or more processors, cause the one or more processors to perform operations of any one of the method EEEs 1-18.

EEE20. A non-transitory, computer-readable medium storing instructions that, upon execution by one or more processors, cause the one or more processors to perform operations of any one of the method EEEs 1-18.

EEE21. The method of any of the method EEEs 1-9, wherein associating each input audio channel with complex gain elements that are defined by a panning function comprises applying each input audio channel to complex gain elements that are defined by a panning function.

EEE22. The method of any of the method EEEs 1-9 and 21, wherein the second location on the unit sphere is at the elevation angle and opposite in a horizontal plane on the unit sphere.

EEE23. The method of any of the method EEEs 1-9, 21, and 22, wherein to adjust a panning behavior in a region around a first location on a unit sphere at an elevation angle comprises to improve a panning behavior in a region around a first location on a unit sphere at an elevation angle, to adjust a panning characteristic in a region around a first location on a unit sphere at an elevation angle, or to improve a panning characteristic in a region around a first location on a unit sphere at an elevation angle.

The invention claimed is:

1. A method of transforming a number of input audio channels to a number of output audio channels, the method comprising:

receiving, using at least one processor, an input audio signal comprising a number of input audio channels;

generating, using the at least one processor, a number of output audio channels by:

associating each input audio channel with complex gain elements that are defined by a panning function, the panning function configured to adjust a panning behavior in a region around a first location on a unit sphere at an elevation angle that is a function of a unit vector and to shift a discontinuity in the region to a second location on the unit sphere at the elevation angle and opposite the first location on the unit sphere, wherein the panning function $p_{up}(x,y,z)$ has a dominant direction at a first panning position $p_{up}(0,0,1)$ and a discontinuity at a second panning position $p_{up}(0,0,-1)$.

2. The method of claim 1, wherein the number of output channels is two.

3. The method of claim 1, wherein the number of output channels is two, and wherein encoding rules define a magnitude of two gain elements and a relative phase between the two gain elements.

4. The method of claim 1, wherein the panning function $p_{up}(x,y,z)$ is given by:

$$p_{up}(x, y, z) = \frac{1}{\sqrt{8(1+z)}} \begin{pmatrix} (1+j)(1+z) + (1-j)(x+jy) \\ (1-j)(1+z) + (1+j)(x+jy) \end{pmatrix}$$

5. A system comprising:

one or more processors; and a non-transitory computer-readable medium storing instructions that, upon execution by the one or more processors, cause the one or more processors to perform operations of the method of claim 1.

6. A non-transitory, computer-readable medium storing instructions that, upon execution by one or more processors, cause the one or more processors to perform operations of the method of claim 1.

7. The method of claim 1, wherein associating each input audio channel with complex gain elements that are defined by a panning function comprises applying each input audio channel to complex gain elements that are defined by a panning function.

8. The method of claim 1, wherein the second location on the unit sphere is at the elevation angle and opposite in a horizontal plane on the unit sphere.

9. The method of claim 1, wherein to adjust a panning behavior in a region around a first location on a unit sphere at an elevation angle comprises to improve a panning behavior in a region around a first location on a unit sphere at an elevation angle, to adjust a panning characteristic in a region around a first location on a unit sphere at an elevation angle, or to improve a panning characteristic in a region around a first location on a unit sphere at an elevation angle.

10. A method of transforming a number of input audio channels to two output audio channels, the method comprising:

receiving, using at least one processor, an input audio signal comprising a number of input audio channels;

generating, using the at least one processor, two output audio channels by:

associating each input audio channel with complex gain elements that are defined by a panning function, the panning function configured to adjust a panning behavior in a region around a first location on a unit sphere at an elevation angle that is a function of a unit vector and to shift a discontinuity in the region to a second location on the unit sphere at the elevation angle and opposite the first location on the unit sphere, wherein the panning function $p_{f_\alpha}(x,y,z)$ is given by:

$$p_{f_\alpha}(x, y, z) = \lambda \times G' = \begin{pmatrix} \lambda g_1' \\ \lambda g_2' \end{pmatrix},$$

where λ is a complex phase correction coefficient and G' is a two by one column vector of complex gains.

11. A system comprising:

one or more processors; and a non-transitory computer-readable medium storing instructions that, upon execution by the one or more processors, cause the one or more processors to perform operations of the method of claim 10.

12. A non-transitory, computer-readable medium storing instructions that, upon execution by one or more processors, cause the one or more processors to perform operations of the method of claim 10.

13. A method of transforming a number of input audio channels to a number of output audio channels, the method comprising:

receiving, using at least one processor, an input audio signal comprising a number of input audio channels;

generating, using the at least one processor, a number of output audio channels by:

associating each input audio channel with complex gain elements that are defined by a panning function, the panning function configured to adjust a panning behavior in a region around a first location on a unit sphere at an elevation angle that is a function of a unit vector and to shift a discontinuity in the region to a second location on the unit sphere at the elevation angle and opposite the first location on the unit sphere, wherein encoding rules are defined to include a constraint on the panning function given by:

$$p_{f_\alpha}(x, y, z) = p_{f_\alpha}(x, y, z)^H = \begin{pmatrix} \frac{1+y}{2} & \frac{x+jz}{2} \\ \frac{x-jz}{2} & \frac{1-y}{2} \end{pmatrix},$$

where x, y, z are components of a unit vector in a Cartesian coordinate frame, z is non-zero and $p_{f_\alpha}(x,y,z)^H$ is a Hermitian transpose of the panning function $p_{f_\alpha}(x,y,z)$.

14. A system comprising:

one or more processors; and a non-transitory computer-readable medium storing instructions that, upon execution by the one or more processors, cause the one or more processors to perform operations of the method of claim 13.

15. A non-transitory, computer-readable medium storing instructions that, upon execution by one or more processors, cause the one or more processors to perform operations of the method of claim 13.

* * * * *